Aug. 7, 1934.     G. A. HUNTER     1,969,404
HIGH PRESSURE GREASING APPARATUS FOR MOTOR VEHICLES AND THE LIKE
Filed March 6, 1933
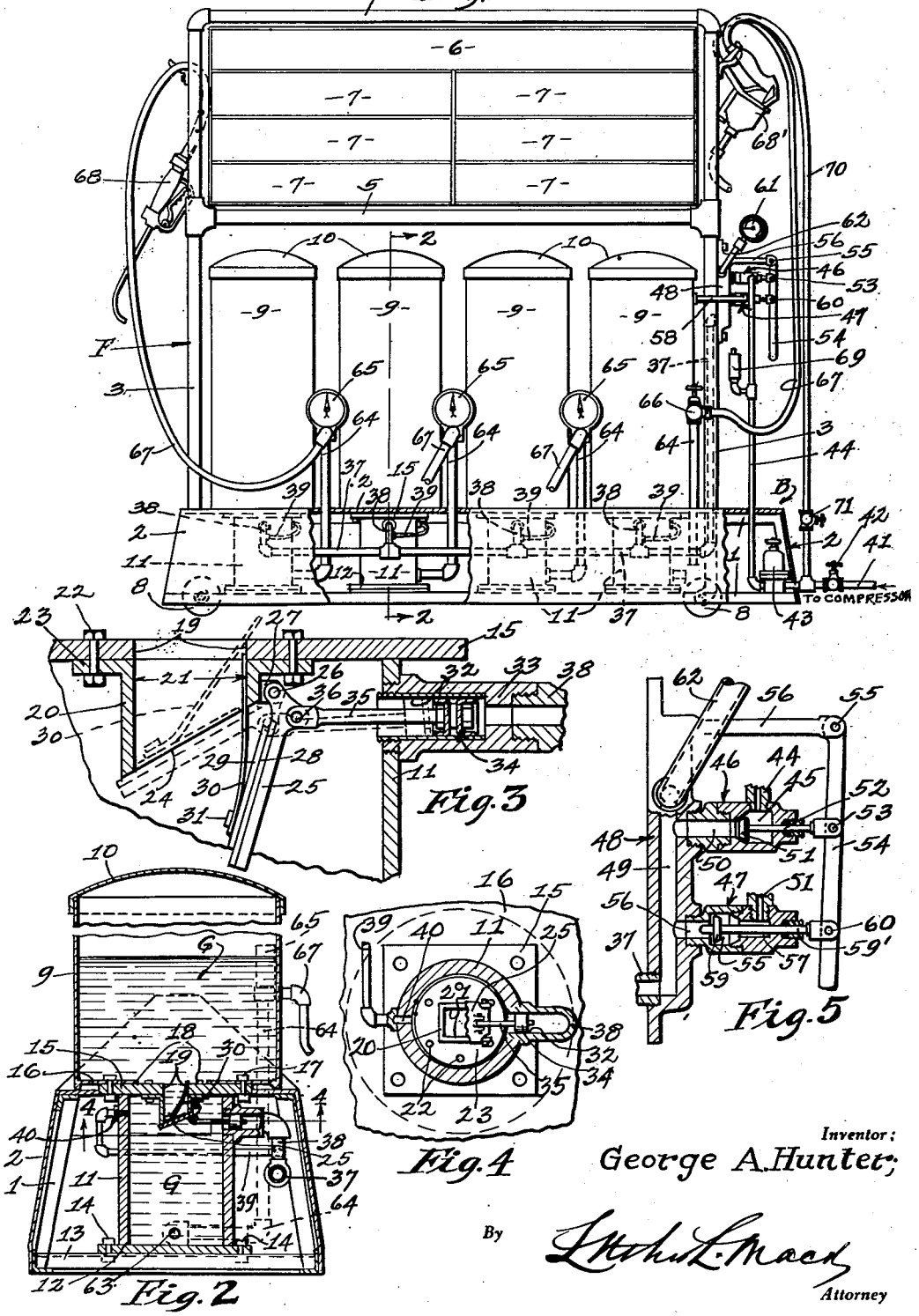
Inventor:
George A. Hunter;
By [signature]
Attorney Patented Aug. 7, 1934

1,969,404

UNITED STATES PATENT OFFICE 1,969,404

HIGH PRESSURE GREASING APPARATUS FOR MOTOR VEHICLES AND THE LIKE

George A. Hunter, Los Angeles, Calif.

Application March 6, 1933, Serial No. 659,870

17 Claims. (Cl. 221—47.1)

This invention relates to and has for an object the provision of a high pressure greasing apparatus particularly adapted for use in the greasing of motor vehicles, and comprising a low pressure storage tank for the grease, a high pressure dispensing tank or cylinder in communication therewith and preferably positioned below the storage tank so that the dispensing tank may be filled by gravity with grease from the storage tank, and a valve for closing communication between the two tanks and operative in the grease, whereby pressure may be applied to the grease in the dispensing tank for forcing the grease outwardly thru suitable dispensing guns or nozzles in a greasing operation.

Another object is to provide a fluid pressure system, preferably air, whereby the air under pressure may be supplied to a single dispensing tank or to a plurality of tanks simultaneously for closing the grease valves, and thereafter automatically by-passing the air to the dispensing tanks for dispensing the grease therefrom.

A further object is to provide means at the completion of a greasing operation whereby when the air supply to the dispensing tanks is discontinued the pressure in the dispensing tanks will be relieved and the air exhausted therefrom into one or more of the grease storage tanks so that any oil or oleous matter from the dispensing tanks may be discharged into one or more of the storage tanks instead of being permitted to accumulate in the air pressure line or connections.

A still further object is to provide a dual air control mechanism including a pressure reducer interposed between a source of compressed air supply and the control valve, and associated control and relief valves reversely operative by common means, for applying air pressure to and for operating the grease valves in the dispensing tanks, and for applying pressure to the grease in said tanks, and for relieving the pressure in said tanks.

In consideration of this invention it will be understood that a greasing apparatus usually embodies one or more high pressure storage tanks of substantial size and weight from which the grease is dispensed directly by admitting air under pressure to the tanks above the volume of grease therein.

Such apparatus is necessarily expensive and cumbersome, and it has been discovered that in such apparatus when air under pressure is supplied to the storage tanks directly moisture is condensed from the air, and by reason of the pressure in the tanks to a certain extent emulsifies the grease therein by aeration, thereby reducing the consistency and efficiency of the grease supplied for use. The objects of my invention, therefore, are primarily two-fold: First, by providing a low pressure storage tank for the grease, of substantial size, and a high pressure dispensing tank associated therewith, and of relatively small size, I reduce the size and weight of the apparatus; and, second, the absence of compressed air in the storage tank and the intermittent application of compressed air to the grease in the dispensing tanks, together with the relief of pressure in the dispensing tanks at the end of each greasing operation, eliminates the possibility of emulsification of the grease and the attendant disadvantages.

Other objects may appear as the description progresses.

In the accompanying drawing I have shown a preferred form of invention, subject to modification within the scope of the appended claims without departing from the spirit thereof. In said drawing, Fig. 1 is a side elevation of a greasing apparatus embodying my invention and preferably arranged so as to include a plurality of greasing units, each including a storage tank and a dispensing tank, a meter for the grease dispensed, and a suitable dispensing hose and gun or nozzle, together with means for applying and controlling the compressed air to and from the dispensing cylinder.

Fig. 2 is an enlarged sectional elevation of one of the greasing units on line 2—2 of Fig. 1, the structure of which is typical of all of the other units.

Fig. 3 is an enlarged fragmentary section of one of the dispensing tanks showing the air operated grease valve therein.

Fig. 4 is a sectional plan of one of the dispensing tanks on line 4—4 of Fig. 2.

Fig. 5 is an elevation partly in section of a dual air controlled valve for controlling the supply of air to and from the dispensing tanks.

While I have shown in the drawing and will describe herein an apparatus composed of a plurality of greasing units, usually four in number, it will be understood that my invention contemplates the use of one or more units, as may be desired, embodying the same principle of operation. As generally constructed, I provide a base B mounted on a suitable articulated skeleton frame 1 and covered by means of a thin sheet metal housing 2. A frame F is suitably secured to the frame 1 of base B and preferably includes a pair of standards 3, 3 near the ends of the base and centrally positioned thereon, which are cross connected at the top by means of a rail 4, and intermediate the top and the base by means of a similar rail 5.

The members 3, 3, 4 and 5 are preferably of tubular construction and intermediate the rails 4 and 5 it is customary to provide a plurality of panels 6, 7, 7 etc., on which may be supported suitable accessory apparatus, together with instructions for the use thereof.

The apparatus as shown in Fig. 1 is preferably of portable character, and to this end I provide on the base a plurality of wheels or rollers, as at 8, 8. On the top of the base housing 2 I provide a plurality of tanks 9, 9 etc., with detachable covers 10, 10 etc., thereon for the purpose of affording access to the tanks. Said tanks are constructed as shown in Fig. 2 of thin sheet metal and are of light weight and capable of holding a substantial quantity of grease, as at G, therein.

Immediately below each of the tanks 9 I provide a high pressure distributing tank or cylinder 11 having a wall of substantial thickness so as to withstand high pressures therewithin. The tanks 11 are permanently closed at their lower ends by means of flanges 12, which are welded to the bodies of the tanks and are secured to cross members 13 of the frame 1 by means of bolts 14. The upper ends of tanks 11 are similarly closed by means of flanges 15 welded to the body of the tank, and are secured to the bottoms 16 of tanks 9 by means of bolts 17. The bottoms 16 of tanks 9 are provided with central openings 18 and the flanges 15 of tanks 11 have openings 19 therein whereby communication is afforded between the interior of tanks 9 and the dispensing cylinders 11. The opening 19 between tanks 9 and 11 is preferably square, and immediately below and attached to the upper flange 15 of cylinder 11 I provide a valve body 20 with a passage 21 therethru which corresponds in size to and registers with the opening 19.

The valve body 20 is secured to the end 15 of tank 11 by means of bolts 22 which extend thru a flange 23 of the valve body, as shown in Fig. 3. The lower end of the valve body 20 is disposed on an inclined plane 24 and is adapted to be closed by means of a valve 25 which is pivoted at 26 to one or more lugs 27 formed on a side of the body 20. The valve 25 is provided on its inner and upper face with a suitable washer or gasket 28 which may be held in position by means of a metal plate or washer 29, and the valve is continually urged into open position by means of a leaf spring 30 secured at 31 to the valve and having its upper free end resting against the adjacent side of the opening 21 in the valve body 20. It will be understood that the valve 25 is adapted to be closed when submerged in the grease which settles into the tank 11 from the tank 9. For this reason positive means is provided for closing the valve by the application of air pressure thereto while the tension of spring 30 is sufficient for opening the valve when the air pressure is relieved and the contents of the tank 11 have been wholly or partially dispensed.

Air is supplied to the valve 25 thru a cylinder 32 which is held in a fitting 33 secured to a side of tank 11. A piston or plunger 34 is reciprocably mounted in the cylinder 32 and has a stem 35 extended inwardly and pivotally connected at 36 with valve 25 at a point near the fulcrum 26 of said valve.

Each of the tanks 11 is similarly connected with an air pressure line 37 by means of a branch pipe 38 which connects with the fitting 33 of each tank 11. A by-pass 39 of substantially less area than the pipes 37 and 38 connects at 40 with each of the cylinders 11 so that air is supplied under pressure from pipe 37 primarily to the cylinders 32, and secondarily to the interior of tanks 11.

Compressed air from a source of supply, as from a compressor, at a pressure of preferably 150 pounds, is delivered thru a pipe 41 having a control valve 42 therein to a pressure reducing apparatus 43 of conventional design. The air under a reduced pressure, preferably of 90 pounds, is conducted from the reducer 43 thru a pipe 44 to a chamber 45 of a control valve 46 commonly mounted with a relief valve 47 on a base 48 preferably attached to one of the standards 3 of frame F. The base 48 has a passage 49 therein which communicates at its lower end with the air line 37 leading to all of the dispensing tanks 11. Control valve 46 is provided with a passage 50 in constant communication with passage 49 in base 48, and a valve 51 normally closing communication between passage 50 and chamber 45, pressure in chamber 45 therefore serves to retain valve 51 normally in closed position for preventing a supply of air thru pipe 37 to tanks 11.

Valve 51 has a stem 52 which is pivotally connected at 53 to an operating lever 54, and said lever is pivoted at 55 to an arm 56 integral with or secured to but extending outwardly from the base 48. Relief valve 47 is formed and operated reversely with respect to the control valve 46 so that the relief valve 47 will be normally open to communication with passage 49 when valve 46 is closed, etc. Valve 47 has a chamber 55 with a passage 56 leading therefrom to and in communication with the passage 49. The chamber 55 also communicates thru a passage 57 and a pipe 58 with one of the tanks 9 when the valve proper 59 therein is open, as shown in Fig. 5. Said valve 59 has a stem 59' which is pivoted at 60 to the operating lever 54. Thus the operation of lever 54 in a clockwise direction, as seen in Fig. 5, will close valve 51 and open valve 59, and the operation thereof in a reverse direction will open valve 51 and close valve 59.

As a convenience in indicating the pressure in the line 37 I provide a pressure indicator 61 which is connected by means of a pipe 62 with the passage 49 of the valve base 48. Thus when valve 51 is open said indicator will record the obtaining pressure in the cylinders 11 and their connections, and when said valve is closed the indicator is effective for registering the gradually decreasing exhaust pressure as the pressure in the cylinders 11 and their connections is relieved and the air is exhausted into one of the tanks 9 thru pipe 58.

Each of the tanks 11 has an outlet 63 for the grease G therein which connects with a grease pipe 64 leading to a meter 65 for registering the quantity of grease dispensed by the several tanks. In some types of apparatus, however, where the quantity of grease dispensed from one of the tanks 11 is but slight, as in the case of certain bearings or joints of a motor vehicle, the meter 65 may be eliminated and a manually controlled valve 66 substituted therefor. The grease is conducted from the meter 65 and from the valve 66 usually thru flexible hose 67 to which are connected dispensing guns or nozzles 68 and 68'. The gun 68' is shown connected by a hose 70 to pipe 41 and having a control valve 71 whereby direct pressure of air may be applied to the gun 68'. The guns or nozzles connected with the hose 67 are usually of various types corresponding to the particular purpose for which they are intended to be used, and are immaterial to my invention.

A safety valve 69 may be also connected with the pipe 44 at a point intermediate the control valve 46 and the pressure reducer 43.

In operation, one or more of the greasing units, each including a storage tank 9 and a dispensing tank 11, is mounted on a suitable base B and connected with the dual air control valves 46 and 47. A suitable quantity of grease G is supplied to the tanks, the character and consistency of which depends upon the use or uses to which the grease may be put. The valve 25 being normally open by reason of the tension of their springs 30, and there being no pressure in the line 37, the grease from tank 9 will fall by gravity into and will fill the tank 11 of each unit.

When it is desired to use one or all of the units in a greasing operation, the operating lever 54 is moved outwardly, i. e., to the right, as seen in Fig. 5, thereby opening valve 51 to the pressure in pipe 44 and simultaneously closing relief valve 59. Thus the air flows from pipe 44 thru chamber 45, passages 50 and 49 into the air supply pipe 37, and thence is directed thru the branch pipes 38 against the pistons 34 in the cylinders 32, which are moved inwardly, i. e., to the left, as seen in Fig. 3, and serve to close the valves 25 against the inclined lower ends of the bodies 20. It will be understood that the valves 25 are operated while submerged in and against the resistance of the grease in the tanks 11.

Subsequent to the closing of valves 25, pressure is created against the grease in tanks 11 by bypassing the air from pipes 38 thru the pipes 39 and inlets 40. Thus upon the opening of the valves in the dispensing guns or nozzles 68 the grease is ejected under pressure from tanks 11 thru pipes 64, meters 65, hose 67 and guns 68 to the bearings or points to which grease is applied in a mechanism. Pressure in tanks 11 serves to more firmly seat the valves 25, thereby closing tanks 9 to the pressure created in tanks 11 and preventing additional grease to flow from the tanks 9 into tanks 11.

At the completion of a greasing operation the operating lever 54 is moved to the left, as seen in Fig. 5, or inwardly, thereby closing valve 51 and simultaneously opening valve 59. Thus the pressure in tanks 11 and all of their connections is gradually relieved thru pipes 38 and 37, passage 49, relief valve 47 and pipe 58 to the particular tank 9 into which the exhaust air is discharged, together with any oleous content which may have been accumulated by the passage of the air thru tanks 11. All of said connections are thus scavenged and cleansed of any matter which would otherwise clog the pipes, valves, etc., at the completion of each operation.

When the air pressure in the tanks 11 is sufficiently reduced the springs 30 become operative for reopening the valves 25 in order to recharge the tanks 11 with additional quantities of grease necessary for a succeeding operation.

While I have shown and described the pressure tanks 11 mounted below the storage tanks 9, I may employ the same elements and principle of operation by submerging the pressure tanks 11 in the grease G and positioning the same at the bottom of the storage tanks 9. Such an arrangement would be especially desirable in cases where no assembled apparatus was available and a pressure system could be installed in connection with an individual tank for use. The main object, of course, is to position the pressure tanks at a point below or near the bottom of the storage tanks so that the grease will flow by gravity into the pressure tanks.

What I claim is:

1. A greasing apparatus comprising a low pressure storage tank for the grease, a high pressure dispensing tank normally in communication therewith and mounted below the storage tank whereby to receive a supply of grease from the storage tank, a valve submerged in the grease within the dispensing tank and adapted to control communication between the storage and dispensing tanks, a pressure operated member connected with and for closing said valve upon the application of pressure to the grease within the dispensing tank, and means for controlling discharge of the grease from said dispensing tank.

2. A greasing apparatus comprising a low pressure storage tank for the grease, a high pressure dispensing tank normally in communication therewith and mounted below the storage tank whereby to receive a supply of grease from the storage tank, a valve submerged in the grease within the dispensing tank and adapted to control communication between the storage and dispensing tanks, a pressure operated member connected with and for closing said valve upon the application of pressure to the grease within the dispensing tank, means for controlling discharge of the grease from said dispensing tank, and automatically operative means associated with said valve for opening the valve when pressure in the dispensing tank is relieved.

3. A greasing apparatus comprising a high pressure dispensing tank, a low pressure storage tank superposed thereon and normally open to communication therewith, a fluid operated valve controlling communication between said tanks, a pressure operated member connected with and for closing said valve to the dispensing tank, means for controlling the dispensing of the contents of the dispensing tank, and means associated with and for opening said valve when the pressure in the dispensing tank has been reduced to a predetermined extent.

4. A greasing apparatus comprising a high pressure dispensing tank, a low pressure storage tank superposed thereon and normally open to communication therewith, a fluid operated valve controlling communication between said tanks, a pressure operated member connected with and for closing said valve to the dispensing tank, means for controlling the dispensing of the contents of the dispensing tank, means associated with and for opening said valve when the pressure in the dispensing tank has been reduced to a predetermined extent, said air application means including a dual control device embodying a pressure valve and a relief valve, and common means for reversely operating said valve in a single operation of said operating means whereby to apply pressure to the dispensing tank and simultaneously close said relief valve, and vice versa.

5. A greasing apparatus including a low pressure storage tank for the reception of grease, a high pressure dispensing tank mounted below the level of and normally in communication with said storage tank, a fluid pressure operated valve controlling communication between said tanks, means for simultaneously applying pressure to said valve and to the grease in said dispensing tank and including a pressure operated member connected with said valve, means for controlling the discharge of grease from said dispensing tank, and automatically operable means for opening said valve when the pressure in said dispensing tank is relieved to a predetermined extent.

6. A greasing apparatus including a low pressure storage tank for the reception of grease, a high pressure dispensing tank mounted below the level of and normally in communication with said storage tank, a fluid pressure operated valve controlling communication between said tanks, means for simultaneously applying pressure to said valve and to the grease in said dispensing tank and including a pressure operated member connected with said valve, means for controlling the discharge of grease from said dispensing tank, automatically operable means for opening said valve when the pressure in said dispensing tank is relieved to a predetermined extent, and means for automatically relieving the pressure in the dispensing tank when pressure thereto has been discontinued.

7. A greasing apparatus including a low pressure storage tank for the reception of grease, a high pressure dispensing tank mounted below the level of and normally in communication with said storage tank, a fluid pressure operated valve controlling communication between said tanks, a pressure operable valve closing device for closing said valve upon the application of pressure to the grease in said dispensing tank, means for controlling the discharge of grease from said dispensing tank, automatically operable means for opening said valve when the pressure in said dispensing tank is relieved to a predetermined extent, and means for automatically relieving the pressure in the dispensing tank when pressure thereto has been discontinued and for discharging the exhaust air in the said storage tank, for the purpose described.

8. A greasing apparatus comprising a storage tank for the reception of grease, a pressure tank mounted at an elevation below and normally in communication with the storage tank, a valve controlling communication between said tanks, fluid pressure operated means for closing said valve, a by-pass leading from said fluid pressure operated means to and for creating pressure in said pressure tank upon the closing of said valve, and means for dispensing the grease from said pressure tank.

9. A greasing apparatus comprising a storage tank for grease, a pressure tank of substantially less capacity than the storage tank positioned below the level of and normally in communication with the storage tank, a fluid pressure operated valve controlling communication between said tanks, a pressure line leading from a source of supply to said valve and said pressure tank for closing the valve and subsequently creating pressure in the pressure tank, means for controlling the discharge of the contents of the pressure tank, a control valve for regulating and effecting the application of pressure to said valve and said pressure tank and a relief valve connected with said pressure line, and means for simultaneously closing said relief valve upon the opening of said control valve, and vice versa.

10. A greasing apparatus comprising a storage tank for grease, a pressure tank of substantially less capacity than the storage tank positioned below the level of and normally in communication with the storage tank, a fluid pressure operated valve controlling communication between said tanks, a pressure line leading from a source of supply to said valve and said pressure tank for closing the valve and subsequently creating pressure in the pressure tank, means for controlling the discharge of the contents of the pressure tank, a control valve for regulating and effecting the application of pressure to said valve and said pressure tank and a relief valve connected with said pressure line, means for simultaneously closing said relief valve upon the opening of said control valve, and vice versa, and means connecting said storage tank with said relief valve for exhausting the air from the pressure tank into the storage tank at the completion of a greasing operation.

11. A greasing apparatus comprising in combination a storage tank and a pressure tank and a valve therebetween normally open to permit the flow of the contents of the storage tank by gravity into and for filling the pressure tank, a cylinder in communication with said pressure tank, a piston in said cylinder operatively connected with and for closing said valve, and a fluid pressure line connected with said cylinder and having a by-pass leading to the interior of said pressure tank for applying pressure to said piston to close said valve and for creating pressure in the pressure tank upon the closing of said valve.

12. A greasing apparatus comprising in combination a storage tank and a pressure tank and a valve therebetween normally open to permit the flow of the contents of the storage tank by gravity into and for filling the pressure tank, a cylinder in communication with said pressure tank, a piston in said cylinder operatively connected with and for closing said valve, a fluid pressure line connected with said cylinder and having a by-pass leading to the interior of said pressure tank for applying pressure to said piston to close said valve and for creating pressure in the pressure tank upon the closing of said valve, and means for relieving the pressure in said tank at the completion of a greasing operation, and automatically operable means for opening said valve when the pressure in the pressure tank is relieved.

13. A greasing apparatus comprising a storage tank and a pressure tank mounted below the level of the storage tank and in communication therewith to permit the contents of the storage tank to flow by gravity into the pressure tank, fluid pressure operated means including a valve for closing communication between said tanks and operating means therefor, means for conducting a fluid under pressure to said pressure tank and dual fluid control means therefor including a pressure valve connected in the line between a source of supply and said pressure tank, and a relief valve connected with said tank and automatically operative to close the relief valve upon the opening of said pressure valve, and vice versa.

14. A greasing apparatus comprising a storage tank and a pressure tank mounted below the level of the storage tank and in communication therewith to permit the contents of the storage tank to flow by gravity into the pressure tank, fluid pressure operated means including a valve for closing communication between said tanks and operating means therefor, means for conducting a fluid under pressure to said pressure tank and dual fluid control means therefor including a pressure valve connected in the line between a source of supply and said pressure tank, a relief valve connected with said tank and automatically operative to close the relief valve upon the opening of said pressure valve, and vice versa, and means connected with said pressure tank for regulating and effecting the discharge of the contents thereof.

15. A greasing apparatus comprising in combination a storage tank for the reception of grease and a pressure tank mounted at the bottom of the storage tank and in communication therewith whereby grease from the storage tank will flow by gravity into the pressure tank, means for applying pressure to said pressure tank, a valve operably mounted on the pressure tank for closing communication between the pressure and storage tanks at will and means independent of the pressure supply means to said tank for closing said valve, said pressure tank having an outlet, and means connected with said outlet for dispensing the grease from the pressure tank.

16. A greasing apparatus comprising in combination a storage tank for the reception of grease and a pressure tank mounted at the bottom of the storage tank and in communication therewith whereby grease from the storage tank will flow by gravity into the pressure tank, a valve operably mounted on the pressure tank for closing communication between the pressure and storage tanks at will, said pressure tank having an outlet, means connected with said outlet for dispensing the grease from the pressure tank, and means independent of the pressure supply means to said tank for applying fluid pressure to and for closing said valve.

17. A greasing apparatus comprising in combination a storage tank for the reception of grease and a pressure tank mounted at the bottom of the storage tank and in communication therewith whereby grease from the storage tank will flow by gravity into the pressure tank, means for applying pressure to said pressure tank, a valve operably mounted on the pressure tank for closing communication between the pressure and storage tanks at will and means independent of the pressure supply means to said tank for closing said valve, said pressure tank having an outlet, means connected with said outlet for dispensing the grease from the pressure tank, means for applying fluid pressure to and for closing said valve, and a connection leading from said fluid pressure supply to the interior of said pressure tank and operative upon the closing of said valve for ejecting the grease therefrom.

GEORGE A. HUNTER.